(12) United States Patent
Sawai et al.

(10) Patent No.: US 6,225,577 B1
(45) Date of Patent: May 1, 2001

(54) CO-ORDINATES INPUT DEVICE AND A METHOD FOR PRODUCING THE SAME

(75) Inventors: Katsunori Sawai; Hideto Sasagawa; Takeshi Watanabe; Takayuki Ito, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/015,348

(22) Filed: Jan. 29, 1998

(30) Foreign Application Priority Data

Jan. 29, 1997 (JP) .................................................. 9-029783

(51) Int. Cl.[7] .............................. G08C 21/00; G09G 5/00
(52) U.S. Cl. .................................. 178/18.01; 178/18.03; 178/18.04; 178/18.05; 345/173
(58) Field of Search ..................................... 345/173, 174, 345/175, 176, 91, 92, 93; 178/18.01, 18.03, 18.04, 18.05, 18.06, 18.07

(56) References Cited

U.S. PATENT DOCUMENTS

| | | | |
|---|---|---|---|
| 4,479,118 | * | 10/1984 | Cole, Jr. .................................. 345/52 |
| 4,695,827 | * | 9/1987 | Beining et al. ....................... 345/175 |
| 4,748,445 | * | 5/1988 | Togashi et al. ......................... 345/91 |
| 4,794,634 | * | 12/1988 | Torihata et al. ....................... 345/173 |
| 4,822,957 | * | 4/1989 | Talmage, Jr. et al. ............. 178/18.01 |
| 5,220,136 | * | 6/1993 | Kent ................................... 128/18.01 |
| 5,659,332 | * | 8/1997 | Ishii et al. ............................ 345/175 |
| 5,750,940 | * | 5/1998 | Ito et al. ............................... 345/173 |
| 5,844,175 | * | 12/1998 | Nakanishi et al. .................... 345/174 |

* cited by examiner

*Primary Examiner*—Vijay Shankar
(74) *Attorney, Agent, or Firm*—Brinks Hofer Gilson & Lione

(57) ABSTRACT

A co-ordinates input device having a transparent substrate member is composed of: a transparent substrate; an ITO film formed on a surface of the transparent substrate; a pair of electrodes formed at a given distance from each other on the ITO film; an operation region formed between the pair of electrodes; and lead electrodes, extending from the pair of electrodes, formed on the ITO film; in which at least one of the lead electrodes extending from the pair of electrodes is formed on the ITO film on a side of the operation region, and between the lead electrode and the operation region, a groove is formed in the ITO film alone or in the ITO film and continuously extending into the transparent substrate.

4 Claims, 4 Drawing Sheets

CO-ORDINATES INPUT DEVICE AND A METHOD FOR PRODUCING THE SAME

BACKGROUND OF THE INVENTION

1. Field of the Invention

The present invention relates to a co-ordinates input device in which data is input by operating an operation region using input pens, fingers, or the like, and also relates to a method for producing such co-ordinates input devices.

2. Description of the Prior Art

FIG. 6 to FIG. 9 show a co-ordinates input device of the prior art in which an operation region is operated by input pens or the like.

FIG. 6 is a side view of the co-ordinates input device of the prior art, FIG. 7 is a plan view of a lower transparent substrate member of the prior art, FIG. 8 shows the back surface of an upper transparent substrate member of the prior art, and FIG. 9 is a cross-sectional view taken along the line IX—IX of FIG. 7.

In the co-ordinates input device of the prior art, the lower transparent substrate member 20 is composed of: a transparent glass substrate 21; an ITO film (a transparent resistive film made of indium oxide) 22 formed on the entire upper surface of the transparent substrate 21; electrodes 23 and 24 both made of silver, etc. and provided on the ITO film 22 in parallel with each other and at a given distance from each other; an operation region 25 formed between the electrodes 23 and 24; an insulating film 26 provided on the ITO film 22, outside the operation region 25 and along one side of the operation region 25; and lead electrodes 27 and 28, extending from one end of each of the electrodes 23 and 24, formed on the insulating film 26.

The upper transparent substrate member 30 is composed of: a transparent substrate 31 made of a synthetic resin such as transparent polyethylene terephthalate; an ITO film 32 formed on the entire lower surface of the transparent substrate 31; electrodes 33 and 34 both made of silver, etc. and provided on the ITO film 32 in parallel with each other and at a given distance from each other; an operation region 35 formed between the electrodes 33 and 34; an insulating film 36 provided on the ITO film 32, outside the operation region 35 and along one side of the operation region 35; another insulating film 37 which is provided on the ITO film 32, outside the operation region 35 and parallel to the electrode 34, and which connects to the insulating film 36; a lead electrode 38, extending from one end of the electrode 33, formed on the insulating films 36 and 37; and another lead electrode 39 extending from one side of the electrode 34 formed on the insulating film 37.

As is shown in FIG. 6, the upper transparent substrate member 30 and the lower transparent substrate member 20 oppose each other with insulating spacers 40 therebetween such that the ITO films 32 and 22 face each other and the parallel electrodes 33 and 34 oppose portions of the lower substrate on which the lower electrodes 23 and 24 are not formed.

In the above structure, the inputting of co-ordinates is carried out as follows: when the transparent substrate 31 is pressed using an input pen (not shown in the figures), it is deformed so that the upper and lower ITO films 32 and 22 are in contact. The ratio of the resistance between a contact point and the electrode 33 to the resistance between the contact point and the electrode 34 and the ratio of the resistance between the contact point and the electrode 23 to the resistance between the contact point and the electrode 24 are obtained via the lead electrodes 38, 39, 27 and 28.

The ends of the lead electrodes 27 and 28 of the electrodes 23 and 24 and those of the lead electrodes 38 and 39 of the electrodes 33 and 34 are formed close to each other to be connected to outside, for example, by connectors.

Therefore, the lead electrode 27 extending from the electrode 23 on the lower transparent substrate member 20 is formed on the insulating film 26 so as to be insulated from the ITO film 22 and the other lead electrode 28, and the lead electrode 38 extended from the electrode 33 on the upper transparent substrate member 30 is formed on the insulating films 36 and 37 so as to be insulated from the ITO film 32, the other electrode 34, and the lead electrode 39.

As is mentioned above, in the co-ordinates input device of the prior art, the insulating film 26 is formed for insulating the lead electrode 27 from the operation region 25 and the lead electrode 28, and the insulating films 36 and 37 are provided for insulating the lead electrode 38 from the operation region 35, electrode 34, and the lead electrode 39. Therefore, the production cost is raised due to the increased number of production steps and the material cost required for forming the insulating films 26, 36, and 37.

In addition, due to pin holes formed in the insulating films 26, 36, and 37, the lead electrodes 27 and 38 may have continuity with the ITO films 22 and 32, respectively, resulting in inferior products.

Furthermore, steps are formed between the ITO film 22 and the insulating film 26, and between the ITO film 32 and the insulating films 36 and 37. Therefore, when the lead electrodes are prepared by printing, they may be broken at the steps or may become very thin, also resulting in inferior products.

SUMMARY OF THE INVENTION

To solve the above-mentioned problems, according to the first aspect of the present invention, a co-ordinates input device having a transparent substrate member is composed of: a transparent substrate; an ITO film formed on a surface of the transparent substrate; a pair of electrodes formed at a given distance from each other on the ITO film; an operation region formed between the pair of electrodes; and lead electrodes, extending from the pair of electrodes, formed on the ITO film; in which at least one of the lead electrodes extending from the pair of electrodes is formed on the ITO film on a side of the operation region, and between the lead electrode and the operation region, a groove is formed in the ITO film alone or in the ITO film and continuously extending into the transparent substrate.

According to the second aspect of the present invention, a co-ordinates input device having a transparent substrate member has the following structure: one of the lead electrode extending from the pair of electrodes is extended to a portion of the ITO film on the side of the other electrode; and between the lead electrode and the other electrode, a groove is formed in the ITO film alone or in the ITO film and continuously extending into the transparent substrate.

According to the third aspect of the present invention, a method for producing a co-ordinates input device has the following steps for: forming an ITO film on a surface of a transparent substrate; forming a pair of electrodes at a given distance from each other on the ITO film; forming lead electrodes extending from the pair of electrodes; extending at least one of the lead electrodes extended from the pair of electrodes to a side of an operation region formed between the pair of electrodes; and forming a groove in the ITO film alone or in the ITO film and continuously extending into the transparent substrate, between the lead electrode and the operation region by laser irradiation or a cutter.

According to the fourth aspect of the present invention, in a method for producing a co-ordinates input device, one of the lead electrodes extending from the pair of electrodes is extended to the side of the other electrode, and between the lead electrode and the other electrode, a groove is formed in the ITO film alone or in the ITO film and continuously extending into the transparent substrate by laser irradiation or a cutter.

DESCRIPTION OF THE PREFERRED EMBODIMENTS

A co-ordinates input device of an embodiment incorporated in the present invention and a method for producing the co-ordinates input device will be described with reference to FIGS. 1 to 4.

Figure 1:
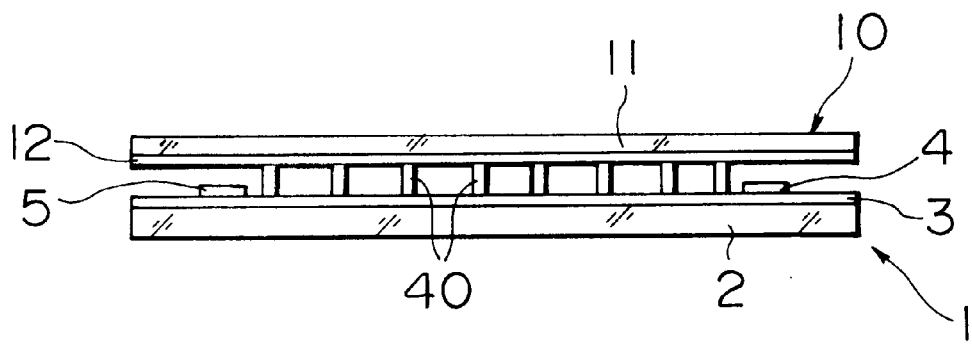
FIG. 1 is a side view of a co-ordinates input device of the present invention.
Figure 2:
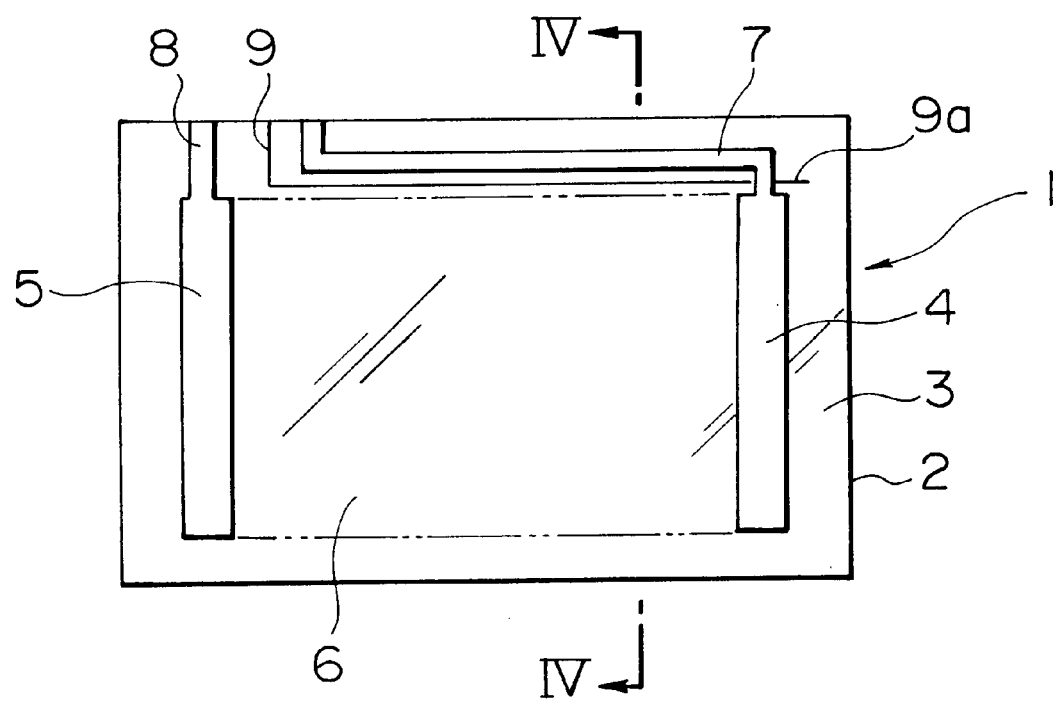
FIG. 2 is a plan view of a lower transparent substrate member of the present invention.
Figure 3:
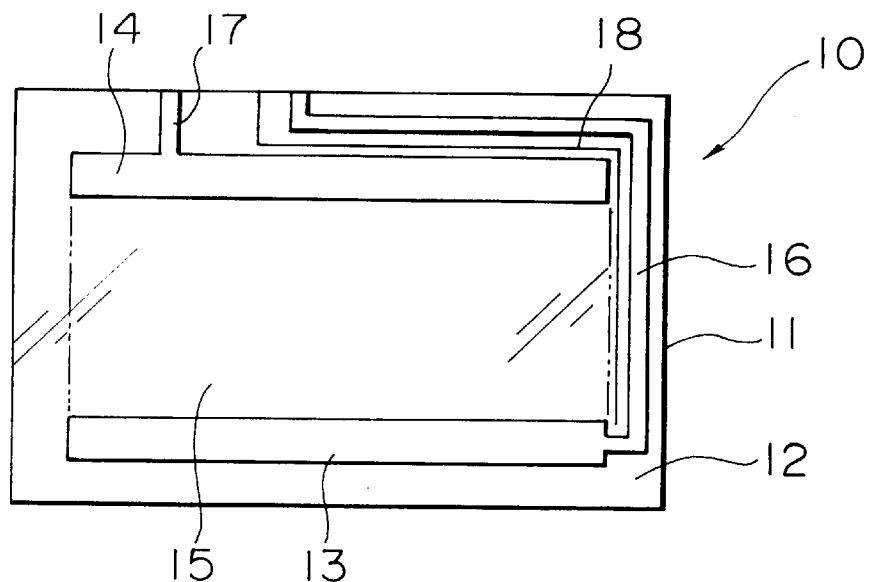
FIG. 3 shows the back surface of an upper transparent substrate member of the present invention.
Figure 4:
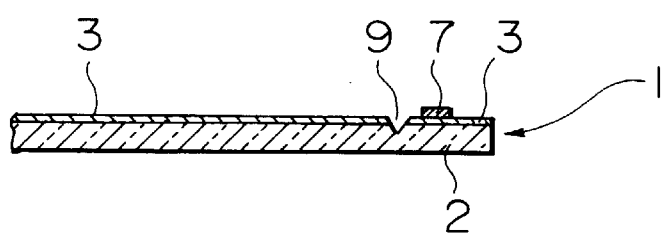
FIG. 4 is a cross-sectional view taken along the line IV—IV of FIG. 2.

FIG. 1 is a side view of the co-ordinates input device of the present invention, FIG. 2 is a plan view of a lower transparent substrate member of the present invention, FIG. 3 shows the back surface of an upper transparent substrate member of the present invention, and FIG. 4 is a cross-sectional view taken along the line IV—IV of FIG. 2.

In the co-ordinates input device of the present invention, the lower transparent substrate member 1 is composed of: a transparent substrate 2 made of glass or a synthetic resin such as polyethylene terephthalate; an ITO film (a transparent resistive film made of indium oxide) 3 formed on the entire upper surface of the transparent substrate 2; electrodes 4 and 5 both made of silver, etc. and provided on the ITO film 3 in parallel with each other and at a given distance from each other; an operation region 6 formed between the electrodes 4 and 5; a lead electrode 7, extending from one end of the electrode 4, formed on the ITO film 3, outside the operation region 6 and along one side of the operation region 6; another lead electrode 8, extending from one end of the electrode 5, formed on the ITO film 3, near the lead electrode 7 and outside the operation region 6; and a groove 9 formed in the ITO film 3 and extending into the transparent substrate 2 is provided continuously between the lead electrode 7 and the operation region 6 and between the lead electrodes 7 and 8.

The lead electrode 7 formed on the ITO film 3 is insulated from the operation region 6 and the lead electrode 8 by the groove 9.

The upper transparent substrate member 10 is composed of: a transparent substrate 11 made of a synthetic resin such as transparent polyethylene terephthalate; an ITO film 12 formed on the entire lower surface of the transparent substrate 11; electrodes 13 and 14 both made of silver, etc. and provided on the ITO film 12 in parallel with each other and at a given distance from each other; an operation region 15 formed between the electrodes 13 and 14; a lead electrode 16, extending from the electrode 13, formed on the ITO film 12, outside the operation region 15 and along two continuous sides of the operation region 15 (one of which sides is parallel to the electrode 14); another lead electrode 17, extending from the electrode 14, formed on the ITO film 12, near the lead electrode 16 and outside the operation region 15; and a groove 18 formed in the ITO film 12 and extending into the transparent substrate 11 is provided continuously between the lead electrode 16 and the operation region 15, between the lead electrode 16 and the electrode 14, and between the lead electrodes 16 and 17.

The lead electrode 16 formed on the ITO film 12 is insulated from the operation region 15, electrode 14, and the lead electrode 17 by the groove 18.

The grooves 9 and 18 are usually prepared by a cutter, which is relatively cheap equipment, however, they may be formed by laser irradiation.

When the transparent substrate 2 is made of glass, it is possible to form the groove 9 only in the ITO film 3, because laser beams are transmitted through the glass substrate 2. In such a case, the depth of the groove 9 can be reduced as compared with that of a groove prepared by a cutter.

When the groove 9 extends over the lead electrode 7 and forms an extension 9a, as is shown in FIG. 2, the portion of the lead electrode 7 corresponding to the extension 9a is printed on the bottom of the extension 9a. Since the depth of the groove 9 and the extension 9a prepared by laser irradiation is lower than that of the groove 9 and the extension 9a, formed in the ITO film 3 and extending into the transparent substrate 2, prepared by a cutter, disconnection of the lead electrode 7 can be prevented.

As is shown in FIG. 1, the upper transparent substrate member 10 and the lower transparent substrate member 1 oppose each other with insulating spacers 40 therebetween such that the ITO films 12 and 3 face each other and the parallel electrodes 13 and 14 oppose the portions of the lower substrate on which the lower electrodes 4 and 5 are not formed.

In the above structure, the inputting of co-ordinates is carried out as follows: when the operation region 15 of the transparent substrate 11 is pressed using an input pen (not shown in the figures), the transparent substrate 11 is deformed so that the upper and lower ITO films 12 and 3 are in contact in the operation regions 6 and 15. The ratio of the resistance between a contact point and the electrode 13 to the resistance between the contact point and the electrode 14 and the ratio of the resistance between the contact point and the electrode 4 to the resistance between the contact point and the electrode 5 are obtained via the lead electrodes 16, 17, 7 and 8.

Figure 5:
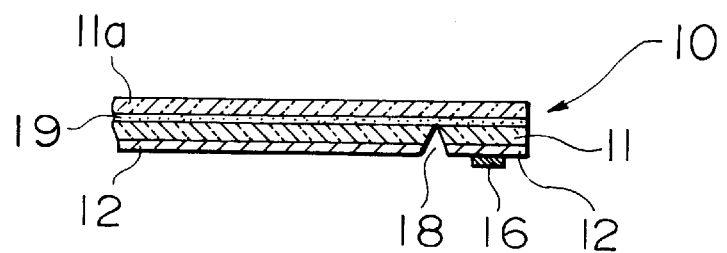
FIG. 5 shows another embodiment of the upper transparent substrate member of the present invention.
Figure 6:
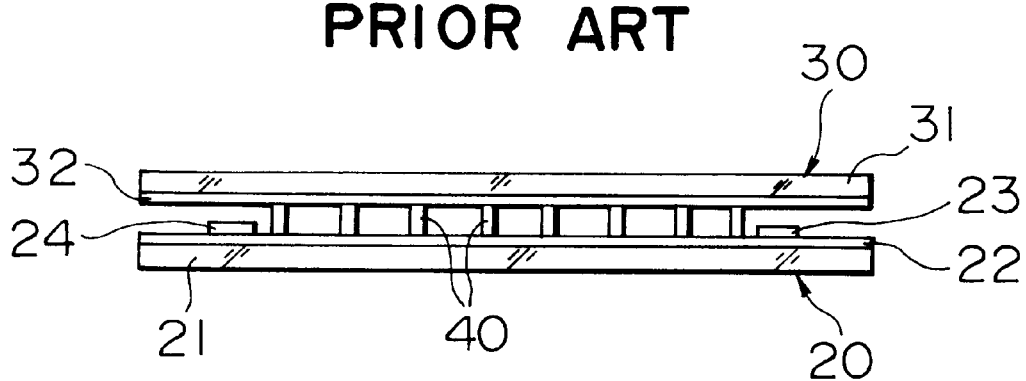
FIG. 6 is a side view of a co-ordinates input device of the prior art.
Figure 7:
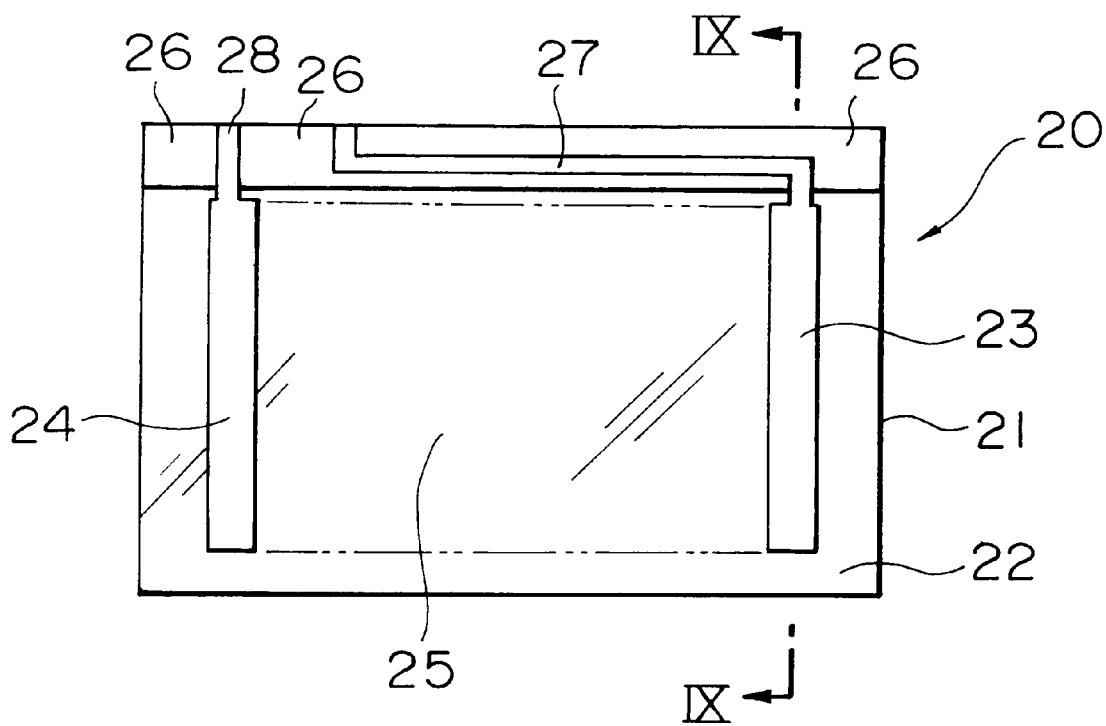
FIG. 7 is a plan view of a lower transparent substrate member of the prior art.
Figure 8:
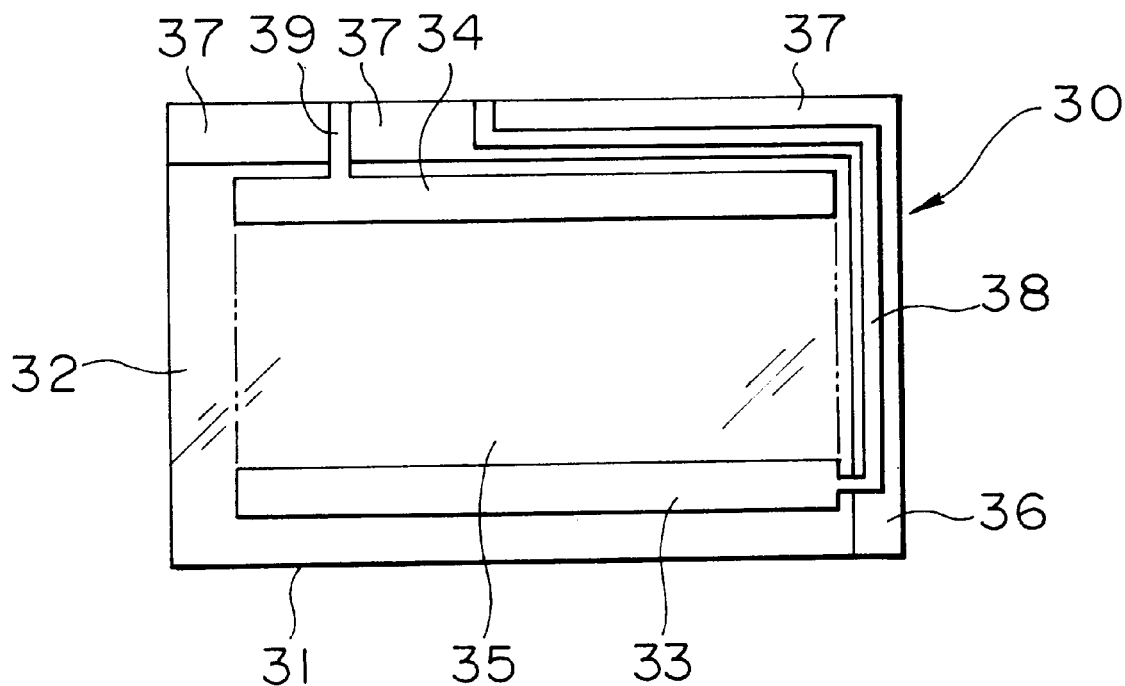
FIG. 8 shows the back surface of an upper transparent substrate member of the prior art.
Figure 9:
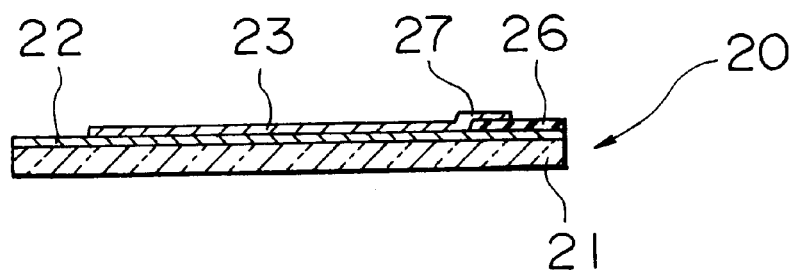
FIG. 9 is a cross-sectional view taken along the line IX—IX of FIG. 7.

FIG. 5 shows another embodiment of the upper transparent substrate member 10 of the present invention. According to this embodiment, on the transparent substrate 11, another transparent substrate 11a is provided with a transparent adhesive film 19 interposed therebetween to achieve a double-layer structure. Therefore, adverse effects of abrasion due to the input pen is reduced so that the life of the transparent substrate increases. Furthermore, the groove 18 formed in the ITO film 12 and extending into the transparent substrate 11 can be deeper, thereby improving the insulating properties of the lead electrode 16.

As mentioned above, according to the present invention, insulating films are not required, since a groove is formed, in an ITO film alone or in an ITO film and extending into a transparent substrate, between a lead electrode and an operation region or between a lead electrode and an electrode. Therefore, co-ordinates input devices can be provided at low cost without pin holes or disconnection.

In addition, the groove can be formed by laser irradiation or a cutter. Thus the lead electrode can be reliably insulated by a simple procedure.

What is claimed is:

1. A coordinate input device comprising a transparent substrate member comprising:

a pair of opposing transparent substrates;

ITO films, each formed on a surface of each of said pair of transparent substrates;

two pairs of linear electrodes, each pair formed at a given distance from each other on each of said ITO films, one pair of linear electrodes being orthogonal to the other pair of linear electrodes;

operation regions, each formed between each pair of said two pairs of linear electrodes; and two pairs of first and second lead electrodes, each pair extending from each pair of said two pairs of linear electrodes on said ITO films;

wherein, in one pair of first and second lead electrodes on one substrate, the first lead electrode extends in the direction of the corresponding linear electrode toward one edge of the corresponding substrate, the second lead electrode extends along the edge of the corresponding substrate toward the vicinity of the first lead electrode, turns to the edge of the corresponding substrate, and extends along the first lead electrode and an insulating groove is formed in said ITO film between the second lead electrode and the corresponding operation region and between the second lead electrode and the first lead electrode;

wherein, in the other pair of first and second lead electrodes on the other substrate, the first lead electrode extends in the direction perpendicular to the corresponding linear electrode toward the proximate edge of the corresponding substrate, the second lead electrode extends along another edge, perpendicular to said proximate edge, of the corresponding substrate and then along the first lead electrode between the first lead electrode and said proximate edge of the corresponding substrate toward the vicinity of the first lead electrode, turns to said proximate edge of the corresponding substrate, and extends along the first lead electrode, and an insulating groove is formed in said ITO film between the second lead electrode and the corresponding operation region and between the second lead electrode and the first lead electrode.

2. A coordinate input device comprising a transparent substrate member as set forth in claim 1, wherein each of the grooves passes through said corresponding ITO film and reaches an interior of said corresponding transparent substrate thereunder.

3. A method for producing a transparent substrate member for a coordinate input device comprising the following steps for:

forming an ITO film on a surface of each of a pair of opposing transparent substrates;

forming a pair of electrodes at a given distance from each other on said ITO film, one pair of linear electrodes on one of the transparent substrates being orthogonal to the other pair of linear electrodes on the other of the transparent substrates;

forming a pair of first and second lead electrodes extending from said pair of linear electrodes, wherein, in one pair of first and second lead electrodes on one substrate, the first lead electrode extends in the direction of the corresponding linear electrode toward one edge of the corresponding substrate, and the second lead electrode extends along the edge of the corresponding substrate toward the vicinity of the first lead electrode, turns to the edge of the corresponding substrate, and extends along the first lead electrode, and, in the other pair of first and second lead electrodes on the other substrate, the first lead electrode extends in the direction perpendicular to the corresponding linear electrode toward the proximate edge of the corresponding substrate, the second lead electrode extends along another edge, perpendicular to said proximate edge, of the corresponding substrate and then along the first lead electrode between the first lead electrode and said proximate edge of the corresponding substrate toward the vicinity of the first lead electrode, turns to said proximate edge of the corresponding substrate, and extends along the first lead electrode; and forming grooves in said ITO films, one formed in said corresponding ITO film between the second lead electrode and the corresponding operation region and between the second lead electrode and the first lead electrode, the other formed in the corresponding ITO film between the second lead electrode and the corresponding operation region and between the second lead electrode and the first lead electrode by laser irradiation or a cutter.

4. A method for producing a transparent substrate member for a coordinate input device as set forth in claim 3, wherein each of the grooves passes through said corresponding ITO film and reaches the interior of said corresponding transparent substrate thereunder.

* * * * *